United States Patent
Nikolov et al.

(10) Patent No.: US 8,933,587 B2
(45) Date of Patent: Jan. 13, 2015

(54) DUAL INPUT RTC SUPPLY GENERATION WITH REPLICA POWER PATH AND AUTONOMOUS MODE OF OPERATION FROM THE SYSTEM SUPPLY

(75) Inventors: Ludmil Nikolov, Chippenham (GB); Carlos Calisto, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 902 days.

(21) Appl. No.: 13/066,611

(22) Filed: Apr. 19, 2011

(65) Prior Publication Data
US 2012/0261994 A1    Oct. 18, 2012

(30) Foreign Application Priority Data

Apr. 13, 2011    (EP) ..................................... 11368016

(51) Int. Cl.
*H02J 9/04*    (2006.01)
*H02J 9/06*    (2006.01)
*G06F 1/30*    (2006.01)

(52) U.S. Cl.
CPC ... *G06F 1/30* (2013.01); *H02J 9/04* (2013.01); *H02J 9/06* (2013.01)
USPC ................................................ 307/66; 307/64

(58) Field of Classification Search
CPC ....................................... H02J 9/04; H02J 9/06
USPC ..................................................... 307/64, 66
See application file for complete search history.

(56) References Cited

U.S. PATENT DOCUMENTS

| | | | | |
|---|---|---|---|---|
| 4,617,473 A | * | 10/1986 | Bingham | .......................... 307/66 |
| 4,698,530 A | | 10/1987 | Thomson | |
| 7,412,196 B2 | | 12/1987 | Uesugi | |
| 4,908,523 A | * | 3/1990 | Snowden et al. | ................ 307/43 |
| 5,157,291 A | * | 10/1992 | Shimoda | ........................ 327/408 |
| 5,283,792 A | | 2/1994 | Davies, Jr. et al. | |
| 5,426,386 A | * | 6/1995 | Matthews et al. | ................ 327/63 |
| 5,604,708 A | * | 2/1997 | Helms et al. | ................... 365/229 |
| 5,650,974 A | * | 7/1997 | Yoshimura | ..................... 365/229 |
| 5,684,384 A | * | 11/1997 | Barkat et al. | .................... 307/66 |

(Continued)

OTHER PUBLICATIONS

European Search Report—11368016.9-2224 Mail date—Oct. 19, 2011, Dialog Semiconductor GmbH.

*Primary Examiner* — Adi Amrany
(74) *Attorney, Agent, or Firm* — Saile Ackerman LLC; Stephen B. Ackerman

(57) ABSTRACT

Circuits and methods providing a electronic power supply applicable to any dual supply rail systems, which require a smooth and uninterrupted output supply and a replica power path and autonomous mode of operation from the system power supply are disclosed. In a preferred embodiment of the invention the power supply is applied to a real time clock. An Innovative Replica Power Path concept and circuit implementation ensures the smooth and uninterrupted transfer of power from one input source to the other. The circuit features a Latched Supply Comparator that guarantees the commutation to the Replica Power Path only happens after the voltage is settled. Zero power consumption from the back-up energy source is achieved in the presence of an alternative higher voltage source. The generated RTC supply voltage does not suffer from abrupt changes when the voltage level of the main system power source (battery or charger) is connected or disconnected. The invention allows for maximum utilization of the energy left in the main battery, thus extending the life of the lower capacity backup battery/super-cap.

7 Claims, 2 Drawing Sheets

(56) References Cited

U.S. PATENT DOCUMENTS

| | | | |
|---|---|---|---|
| 5,739,596 A * | 4/1998 | Takizawa et al. | 307/66 |
| 6,016,045 A | 1/2000 | Thomas et al. | |
| 6,642,750 B1 * | 11/2003 | Egan | 327/63 |
| 7,038,522 B2 * | 5/2006 | Fauh et al. | 327/407 |
| 7,142,038 B2 * | 11/2006 | Baglin | 327/407 |
| 7,541,694 B2 * | 6/2009 | Chamberlain et al. | 307/66 |
| 7,550,954 B2 | 6/2009 | De Nisi et al. | |
| 7,610,501 B2 * | 10/2009 | Turner et al. | 713/340 |
| 2009/0063875 A1 | 3/2009 | Terazono | |

* cited by examiner

DUAL INPUT RTC SUPPLY GENERATION WITH REPLICA POWER PATH AND AUTONOMOUS MODE OF OPERATION FROM THE SYSTEM SUPPLY

BACKGROUND (1) Field of the Invention

This invention relates generally to electronic power supply and is specifically applied in any dual supply rail systems, which require a smooth and uninterrupted output supply as e.g. in dual input supply generation of electronic real time clocks (RTC).

(2) Description of the Prior Art

The real time clock (RTC) supply domain is an essential feature on most of the Power Management (PM) ICs and typically incorporates the following blocks and functionality—crystal (XTAL) oscillator, digital block with control, timer and alarm functions, power-on-reset (POR), and input/supply detection circuits. There are two important requirements for the power supply generation and the power consumption of the RTC domain:

ultra-low (less than 5 uW) power consumption from the back-up power source (coin cell or super capacitor)

zero current from the back-up source in the presence of the main system supply (external charger or main battery)

One popular approach is to power the RTC domain directly from the back-up source. This simple implementation is very attractive but unfortunately does not satisfy the second requirement because of the constant (even when system supply is present) discharge of the back-up power source. To overcome this problem, designs based on this concept have to keep the back-up battery charger permanently on to top up the back-up energy source, which in its turn increases the overall IC power consumption.

Another existing practice is the integration of a supply comparator that monitors the levels of the system rail and the back-up source and connects the RTC power supply to the higher of the two rails. This more power efficient solution though, creates a major design problem. The main principle of operation (connection to the highest supply rail) and the large variation in the voltage levels of the different power sources (4-5.5V external charger, 2-4.5V main battery and 1.5-3.3V back-up battery) implies that the resultant RTC supply voltage level in the extreme case might vary between 1.5V and 5.5V. The implementation of a XTAL oscillator or digital control logic able to operate in such a wide supply range and to sustain the abrupt changes from min to max levels is not a simple design task. Such designs require complex and not necessarily power efficient circuit implementations that are costly in terms of design time and silicon area.

It is a challenge for engineers to provide an alternative method and circuit for power efficient generation of the RTC supply rail that does not have the disadvantages of the existing solutions.

There are known patents or patent publications dealing with RTC power supplies:

U.S. patent (U.S. Pat. No. 6,016,045 to Thomas et al.) discloses a back-up battery system for use with a real-time clock of an on-board device controller. In its normal operation, the real-time clock (RTC) is powered by a primary power source, such as a vehicle battery. When the primary source is interrupted, the back-up battery system is invoked to provide back-up power to the RTC. The system includes a low voltage dry cell battery mounted within a fuse component configured for electrical engagement within the vehicle fuse block. In one embodiment, a relay is interposed between the fuse component and the RTC to make and break the back-up power circuit in response to the state of the primary power source. In another embodiment, the battery within the fuse component is replaceable, with the fuse component including a base and a removable cap. In still another embodiment, the battery within the fuse component is a rechargeable battery, and the back-up power system includes a recharging circuit operable with the primary power source.

U.S. patent (U.S. Pat. No. 7,550,954 to De Nisi et al.) discloses a versatile voltage regulator accommodating either an Alkaline or Lithium-Ion battery main battery and providing low-current power for a real time clock module and for charging a backup battery. Depending upon the battery power source that is used, the present invention provides a best circuit configuration for efficient power conversion. If the power converter according to the present invention provides a regulated output voltage that is greater than the main battery voltage of an alkaline battery, a low drop-out-voltage (LDO) voltage regulator is used in feedback loop with a charge pump. Otherwise, for a Lithium-Ion battery, only a LDO voltage regulator is used. The voltage regulator includes a series low drop-out-voltage (LDO) voltage regulator that is coupled between the main external battery and the Vout load terminal, when the voltage at the Vout load terminal is less than the voltage of the main external battery. The voltage regulator also includes a charge pump circuit adapted to be connected in feedback loop with the LDO regulator and the Vout load terminal, when the voltage at the Vout load terminal exceeds the voltage of the main external battery.

U.S. patent (U.S. Pat. No. 4,698,530 to Thomson) proposes a power switching circuit for automatically switching between line-driven and battery power supplies. The power switching circuit selectively connects first and second input voltage terminals Vdd and Vbb to an output voltage terminal. When the line-driven power supply is on, a first transistor switches on to connect the first input voltage terminal to the output voltage terminal, and a second transistor switches off to isolate the battery. When the line-driven power supply is off, the first transistor switches off, and the second switches on to connect the battery powered second input voltage terminal to the output voltage terminal.

SUMMARY

A principal object of the present invention is to achieve an ultra-low (less than 5 uW) power consumption of the back-up power source (coin cell or super capacitor) of any dual supply rail system, which requires a smooth and uninterrupted output supply.

Another principal object of the present invention is to achieve an ultra-low (less than 5 uW) power consumption of the back-up power source (coin cell or super capacitor) of a RTC.

Moreover a principal object of the invention is to achieve zero current consumption of the back-up source of a RTC during the presence of a main system supply (external charger or main battery).

A further object of the invention is to develop new methods and circuits for generation of an RTC supply rail from two input power sources—back-up battery/super-cap and main system voltage.

A further object of the invention is to develop a replica power path concept and circuit implementation to ensure a smooth and uninterrupted transfer of power from one input source to the other.

A further object of the invention is to develop a circuit featuring a latched supply comparator that guarantees the commutation to the replica power path only happens after the voltage is settled.

Another object of the invention is to ensure that the generated RTC supply voltage does not suffer from abrupt changes when the voltage level of the main system power source (battery or charger) is connected or disconnected.

Furthermore an object of the invention is to implement an autonomous mode of operation allowing power efficient RTC supply generation with no or deeply discharged back-up battery/super-cap.

Moreover an object of the invention is allowing for maximum utilization of the energy left in the main battery, thus extending the life of the lower capacity backup battery/super-cap.

In accordance with the objects of this invention a method for a RTC supply generator with dual input and a replica power path and autonomous mode of operation from the system power supply has been achieved. The method invented, comprises, firstly, the steps of: (1) providing a supply generator generating an output voltage VDDRTC for one or more loads having at least a main supply source VSYS and a back-up supply source VBBAT, a means to compare VSYS and VBBAT, additional comparators, and a buffer amplifier, (2) providing an input reference selector comprising a local reference voltage generator, wherein the selector selects a reference source for said buffer amplifier; and (3) checking if supply generator is enabled and, if so, go to step 4, otherwise go to end in step 9. Furthermore the method invented comprises the steps of: (4) checking if VBBAT<VSYS and, if so, go to step 5, otherwise go to step 7, (5) sourcing the output voltage VDDRTC by a replica power path supplied by the system rail VSYS, wherein larger voltage steps of the output voltage are prevented, oscillations of the output voltage are eliminated, and (6) checking if VBBAT>VSYS+safety margin and, if so, go to step 7, otherwise go to step 5. Finally the method comprises the steps of (7) sourcing from VBBAT, namely powering down all analog components of the supply generator not required for back-up supply and sourcing the output voltage VDDRTC from back-up supply VBBAT, (8) checking if VBBAT<VSYS and, if so, go to step 5, otherwise go to step 7, and (9) end.

In accordance with the objects of this invention a circuit for an electronic power supply applicable to any dual supply rail systems, which require a smooth and uninterrupted output supply with dual input and a replica power path and autonomous mode of operation from the system power supply has been achieved. The circuit invented comprises, firstly a port for a main system supply VSYS, a port for a back-up supply voltage VBBAT, and a input reference selector comprising: a reference voltage generator having its output connected to a second input of a first comparator, said first comparator having its first input connected to VBBAT voltage and wherein its output is controlling a reference switch, and said reference switch switching between a terminal connected to VBBAT and a terminal connected to the output of the reference voltage generator, wherein its output is connected to a positive input of a buffer amplifier. Furthermore the circuit comprises said buffer amplifier having its negative input connected to its output, wherein its output is connected to a first input terminal of an output supply switch and to a first input of a second comparator, said second comparator having its second input connected to a first terminal of a voltage source and controlling with its output said output supply switch, and said voltage source having its second terminal connected to an output port of the supply generator. Finally the circuit comprises said output supply switch switching between the first terminal and a second terminal, that is connected to VBBAT, wherein its output is connected to the output port of the supply generator, a bulk switch comparator comparing VBBAT with VSYS wherein its output is connected to a first input of a NAND gate, and said NAND gate wherein its second input is a master enable signal for the RTC supply generator and its output is a nVREG_EN signal.

BRIEF DESCRIPTION OF THE DRAWINGS

In the accompanying drawings forming a material part of this description, there is shown.

DESCRIPTION OF THE PREFERRED EMBODIMENTS

Preferred embodiments of the invention disclose methods and circuits for power efficient generation of a RTC supply rail that consumes ultra-low (less than 5 µW) power from a back-up source and consumes zero power in the presence of a main system supply as e.g. an external charger or a main battery).

The proposed principle and implementation can generally be used in any dual supply rail system, which requires a smooth and uninterrupted output supply. The generated output supply rail can be used to power any analogue or digital circuit. It is most suited for supply sensitive analogue circuits (BGAPs, reference generators, oscillators, etc.) as well as accurate level sensing circuits (comparators, analogue PORs, sensors, etc.)

It should be noted that the RTC supply voltage could be used for other components of an electronic system as well such as e.g. supply sensitive analogue circuits, level detection/sensing circuits and any digital circuitry.

Figure 1:
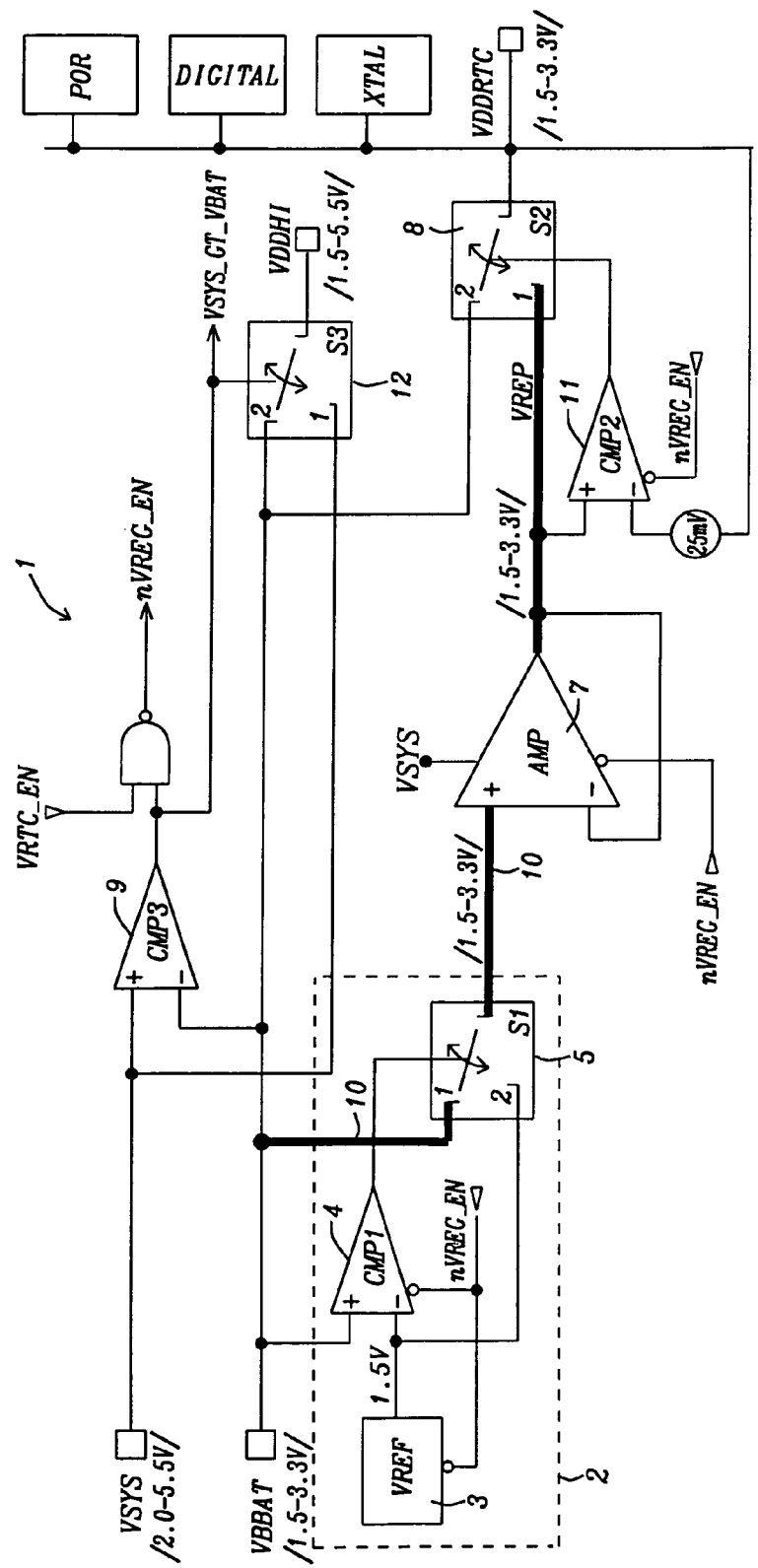
FIG. 1 illustrates a block diagram of a circuit implementation of a preferred embodiment of the invented generation of the RTC supply voltage.

The block diagram in FIG. 1 illustrates a circuit implementation of a preferred embodiment 1 of the invented generation of the RTC supply voltage VDDRTC. The two input power sources are denoted as VBBAT—back-up battery or super capacitor and VSYS—main system supply from an external charger or main battery. The nominal voltage of VBBAT, i.e. fully charged VBBAT, is usually lower than the nominal value of VSYS, i.e. the output voltage of the external charger or the voltage level of the fully charged main battery. Both voltages VSYS and VBBAT may change dependent upon the power condition of the correspondent batteries. In the example of a preferred embodiment of the invention in normal operation the voltage VSYS varies between 5.5 V and 2.0 V and the back-up source VBBAT varies between 3.3 V, if fully charged, and 1.5 V. These are the voltage ranges both voltages are operational. The lower limit of 1.5 V corresponds e.g. to a lower supply limit of the load, as the RTC for instance. Obviously other lower supply limits are possible as well e.g. for other applications. The output voltage VDDRTC may vary e.g. between 1.5 V and 3.3 V.

The proposed VDDRTC generator consists of three main parts—input reference selector 2, buffer stage 7, and output supply switch 8.

The input reference selector 2, comprising VREF generator 3, comparator CMP1 4, and reference switch S1 5, provides a VBBAT tracking reference with a minimum value of e.g. 1.5V on the reference input of the unity gain buffer amplifier 7. The integration of a local reference voltage of e.g. VREF=1.5V is a prerequisite for the additional Autonomous Mode of operation, which allows power efficient RTC supply generation even when the back-up energy source is not present or deeply discharged (VBBAT<1.5V). Other values of the reference voltage VREF are possible as well.

The VREF block is supplied from VDDHI, which is the higher of the two supply inputs VSYS and VBBAT. VDDHI is always the highest voltage in the system. In a preferred embodiment of a VREF block a VREF block architecture is based on a Beta Multiplier type current generator. The generated current across a Diode—Resistor combination (in a way similar to a band gap) generates the reference voltage of e.g. VREF=1.5 V.

The power condition of a not present or not sufficient back-up energy source is detected by the reference comparator CMP1 4. Its output state (OUT1=0) forces the S1 switch 5 to position 2, hence connecting the input of the unity gain amplifier AMP 7 to the local reference VREF. The unity gain buffer AMP 7 is powered from VSYS. When VSYS is available it is the power source for the replica path. Obviously, an Autonomous Mode of operation is only possible when the main system supply VSYS is present.

The highlighted new Replica Power Path 10, signified by a thick line 10, is realized from the unity gain buffer AMP 7, the supply comparator CMP2 11, and the output supply switch S2 8.

The Autonomous Mode is to cover systems that have no or insufficient back-up power source. In this case for as long as VSYS is present the circuit will maintain VDDRTC at VREF level, which is e.g. 1.5 V. It is also to cover cases when the back-up source is present but deeply discharged, for instance a new phone that was sitting for months in the shop. At initial turn on VBBAT is likely to be lower than a minimum operational level, e.g. 1.5V. In that case VDDRTC will start immediately as e.g. 1.5V corresponding to VREF. At the same time the system may also start the charging of the back-up battery. When its voltage VBBAT goes above 1.5V CMP1 4 will detect this and flip S1 5 to position 1 which will change the reference for the buffer. From this point on VDDRTC will follow the VBBAT voltage as it is charged to its final value.

FIG. 1 shows this replica path highlighted by a thick line. The amplifier AMP 7 is used to buffer a reference voltage, which normally follows VBBAT or, dependent on the power condition of the back-up source, VREF. Therefore the reference voltage at the positive input and the output of the buffer amplifier AMP 7 varies in the preferred embodiment of the invention between e.g. 1.5 V and 3.3 V. The output supply switch S2 8 is controlled by two comparators. Indirectly (via the nVREG_EN enable signal), the VDDHI bulk-switch comparator CMP3 9 determines which input—VBBAT or the internal replica VREP to be connected to the output.

In addition, the second comparator CMP2 11 only allows the switchover to the internal replica supply when it is well settled within 25 mV of the current VDDRTC voltage level. This range could obviously differ slightly from the range of 25 mV. This feature prevents larger (>25 mV) voltage steps on the VDDRTC rail that may potentially disturb the operation of the RTC domain circuits. The integration of the Latched Comparator CMP2 11 is an effective counter measure for the finite response and start-up time of the AMP buffer 7. The built in hysteresis is the reason for the latch type behavior of the circuit, i.e. once the comparator CMP2 11 output toggles high (OUT2=1) it can only be reset to 0 by the enable signal nVREG_EN=1. This circuit enhancement eliminates the possibility of having VDDRTC oscillations caused by load transients.

"The Replica Power Path 10 concept guarantees a smooth and uninterrupted switchover during transients on the VSYS input rail. This is achieved by connecting the VDDRTC rail either to the VBBAT (backup source voltage) or the internally generated replica VREP of the backup voltage. The switchover is controlled indirectly by the bulk-switch comparator CMP3 9 and directly by comparator 11 and switch 8."

The conditions for the VDDRTC power source switchover are defined as follows:

VDDRTC=VBBAT, when VBBAT>VSYS+75 mV
VDDRTC=VREF when VBBAT<VSYS

The 75 mV of the equation above are a safety margin, which could slightly differ. The bulk-switch comparator 9 is also used to control the bulk switch S3 12 which generates VDDHI—the highest voltage rail in the system, used to power and properly bias the analogue and digital circuits of the RTC supply generator, and to ensure the correct level shifting of the interface signals. Comparator CMP3 9 is an always-on circuit, hence is designed to have zero current consumption from the VBBAT rail.

In order to prevent the unnecessary discharge of the main system rail (respectively main battery) the remaining analogue blocks (VREF 3, CMP1 4, AMP 7 and CMP2 11) are powered down by signal nREG_EN=1 whenever the main battery voltage, respectively VSYS, is lower than VBBAT.

The RTC_EN signal shown on FIG. 1 is a master enable signal for the RTC supply generator block.

Figure 2:
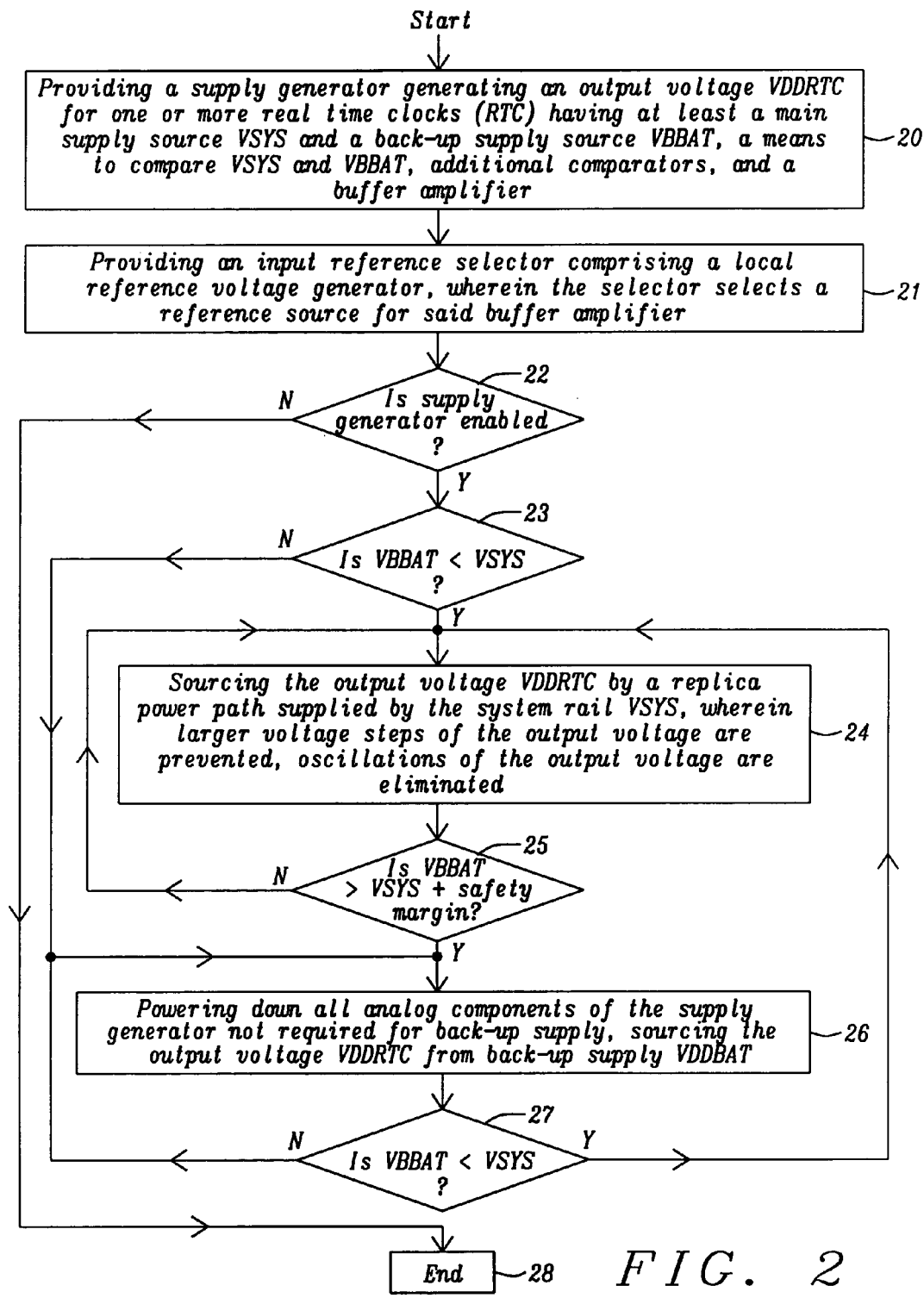
FIG. 2 illustrates a flowchart of a method invented to operate a RTC supply generator with dual input and a replica power path and autonomous mode of operation from the system power supply.

FIG. 2 illustrates a flowchart of a method invented to operate a RTC supply generator with dual input and a replica power path and autonomous mode of operation from the system power supply.

Step 20 of the method of FIG. 2 illustrates the provision of a supply generator generating an output voltage VDDRTC for one or more real time clocks (RTC) having at least a main supply source VSYS and a back-up supply source VBBAT, a means to compare VSYS and VBBAT, additional comparators, and a buffer amplifier. Step 21 depicts providing an input reference selector comprising a local reference voltage generator, wherein the selector selects a reference source for said buffer amplifier. Step 22 illustrates checking if supply generator is enabled and, if so, go to step 23, otherwise go to step 28. The following step 23 shows checking if VBBAT<VSYS and, if so, go to step 24, otherwise go to step 26. Step 24 illustrates sourcing the output voltage VDDRTC by a replica power path supplied by the system rail VSYS, wherein larger voltage steps of the output voltage are prevented and oscillations of the output voltage are eliminated. Step 25 is a check if VBBAT>VSYS+a safety margin and, if so, go to step 26, otherwise go back to step 24. Step 26 describes sourcing from VBBAT, namely powering down all analog components of the supply generator not required for back-up supply and sourcing the output voltage VDDRTC from back up supply VBBAT. Step 27 is a check if VBBAT<VSYS and, if so, go to step 24, otherwise go back to step 26. Step 28 signifies the end of the method.

While the invention has been particularly shown and described with reference to the preferred embodiments thereof, it will be understood by those skilled in the art that various changes in form and details may be made without departing from the spirit and scope of the invention.

What is claimed is:

1. A circuit for an electronic power supply applicable to any dual supply rail systems, which require a smooth and uninterrupted output supply, comprising:

a port for a main system supply VSYS;

a port for a back-up supply voltage VBBAT;

an input reference selector comprising:

a reference voltage generator having its output connected to a second input of a first comparator;

said first comparator having its first input connected to VBBAT voltage and wherein its output is controlling a reference switch; and said reference switch switching between a terminal connected to VBBAT and a terminal connected to the output of the reference voltage generator, wherein its output is connected to a positive input of a buffer amplifier;

said buffer amplifier having its negative input connected to its output, wherein its output is connected to a first input terminal of an output supply switch and to a first input of a second comparator;

said second comparator having its second input connected to a first terminal of a voltage source and controlling with its output said output supply switch;

said voltage source having its second terminal connected to an output port of the circuit;

said output supply switch switching between the first terminal and a second terminal, that is connected to VBBAT, wherein its output is connected to the output port of the circuit;

a bulk switch comparator comparing VBBAT with VSYS wherein its output is connected to a first input of a NAND gate; and said NAND gate wherein its second input is a master enable signal for the circuit and it's output is an nVREG_EN signal.

2. The circuit of claim 1 wherein said nVREG_EN signal enables and disables, depending on the output of said bulk switch comparator, the reference voltage generator, said first comparator, said buffer amplifier, and said second comparator in order to reduce the power consumption.

3. The circuit of claim 1 wherein the output of said bulk switch comparator controls a VDDHI switch switching between VSYS and VBBAT, wherein the VDDIHI switch provides with its output the highest voltage rail of the system used to power and properly bias all digital and analog circuits of the citcuit.

4. The circuit of claim 1 wherein said reference voltage generator is based on a Beta Multiplier type current generator.

5. The circuit of claim 4 wherein a current, generated by said current generator, across a diode/resistor combination generates the reference voltage.

6. The circuit of claim 1 wherein the circuit supplies a real time clock.

7. The circuit of claim 1 wherein the circuit is an RTC supply generator.

* * * * *